(12) United States Patent
Burtscher

(10) Patent No.: US 8,065,664 B2
(45) Date of Patent: *Nov. 22, 2011

(54) SYSTEM AND METHOD FOR DEFINING AND DETECTING PESTWARE

(75) Inventor: Michael Burtscher, Longmont, CO (US)

(73) Assignee: Webroot Software, Inc., Broomfield, CO (US)

( * ) Notice: Subject to any disclaimer, the term of this patent is extended or adjusted under 35 U.S.C. 154(b) by 1189 days.

This patent is subject to a terminal disclaimer.

(21) Appl. No.: 11/462,956

(22) Filed: Aug. 7, 2006

(65) Prior Publication Data
US 2008/0052679 A1 Feb. 28, 2008

(51) Int. Cl.
G06F 9/44 (2006.01)

(52) U.S. Cl. ........ 717/126; 717/124; 717/128; 717/130; 717/131; 717/158

(58) Field of Classification Search .................. 717/124, 717/126–128, 130–131, 141, 133, 158
See application file for complete search history.

(56) References Cited

U.S. PATENT DOCUMENTS

| | | | |
|---|---|---|---|
| 5,623,600 A | 4/1997 | Ji et al. | |
| 5,745,725 A * | 4/1998 | Simpson | 712/214 |
| 5,920,696 A | 7/1999 | Brandt et al. | |
| 5,951,698 A | 9/1999 | Chen et al. | |
| 6,069,628 A | 5/2000 | Farry et al. | |
| 6,070,009 A * | 5/2000 | Dean et al. | 717/130 |
| 6,073,241 A | 6/2000 | Rosenberg et al. | |
| 6,092,194 A | 7/2000 | Touboul | |
| 6,154,844 A | 11/2000 | Touboul | |
| 6,167,520 A | 12/2000 | Touboul | |
| 6,226,787 B1 * | 5/2001 | Serra et al. | 717/125 |
| 6,310,630 B1 | 10/2001 | Kulkarni et al. | |
| 6,397,264 B1 | 5/2002 | Stasnick et al. | |
| 6,405,316 B1 | 6/2002 | Krishnan et al. | |
| 6,460,060 B1 | 10/2002 | Maddalozzo, Jr. et al. | |
| 6,480,962 B1 | 11/2002 | Touboul | |
| 6,535,931 B1 | 3/2003 | Celi, Jr. | |
| 6,611,878 B2 | 8/2003 | De Armas et al. | |
| 6,633,835 B1 | 10/2003 | Moran et al. | |
| 6,667,751 B1 | 12/2003 | Wynn et al. | |
| 6,701,441 B1 | 3/2004 | Balasubramaniam et al. | |

(Continued)

FOREIGN PATENT DOCUMENTS

WO 2007007326 1/2007

(Continued)

OTHER PUBLICATIONS

Title: Semantics-Aware Malware Detection, author: Mihai christodorescu et al, source: IEEE, dated: May 8, 2005.*

(Continued)

Primary Examiner — Chameli C Das
(74) Attorney, Agent, or Firm — Cooley LLP

(57) ABSTRACT

A system and method for defining and detecting pestware is described. One embodiment includes receiving a file and placing at least a portion of the file into a processor-readable memory of a computer. A plurality of execution paths within code of the pestware file are followed and particular instructions within the execution paths are identified. A representation of the relative locations of each of the particular instructions within the code of the file are compared against a pestware-definition file so as to determine whether the file is a potential pestware file.

14 Claims, 3 Drawing Sheets

U.S. PATENT DOCUMENTS

| | | | |
|---|---|---|---|
| 6,772,345 B1 | 8/2004 | Shetty | |
| 6,785,732 B1 | 8/2004 | Bates et al. | |
| 6,804,780 B1 | 10/2004 | Touboul | |
| 6,813,711 B1 | 11/2004 | Dimenstein | |
| 6,829,654 B1 | 12/2004 | Jungck | |
| 6,910,134 B1 | 6/2005 | Maher | |
| 6,965,968 B1 | 11/2005 | Touboul | |
| 6,966,059 B1 | 11/2005 | Shetty | |
| 7,058,822 B2 | 6/2006 | Edery et al. | |
| 7,107,617 B2 | 9/2006 | Hursey et al. | |
| 7,111,290 B1* | 9/2006 | Yates et al. | 717/158 |
| 7,210,168 B2 | 4/2007 | Hursey | |
| 7,346,611 B2* | 3/2008 | Burtscher | 707/737 |
| 7,349,931 B2* | 3/2008 | Horne | 1/1 |
| 7,353,505 B2* | 4/2008 | O'Dowd | 717/158 |
| 7,392,543 B2* | 6/2008 | Szor | 726/23 |
| 7,437,718 B2* | 10/2008 | Fournet et al. | 717/133 |
| 7,490,352 B2* | 2/2009 | Kramer et al. | 726/22 |
| 7,565,695 B2* | 7/2009 | Burtscher | 726/24 |
| 7,707,635 B1* | 4/2010 | Kuo et al. | 726/24 |
| 7,810,091 B2* | 10/2010 | Gartside et al. | 717/177 |
| 2002/0066080 A1* | 5/2002 | O'Dowd | 717/128 |
| 2002/0162015 A1 | 10/2002 | Tang | |
| 2002/0166063 A1 | 11/2002 | Lachman et al. | |
| 2003/0065943 A1 | 4/2003 | Geis et al. | |
| 2003/0074581 A1 | 4/2003 | Hursey et al. | |
| 2003/0101381 A1 | 5/2003 | Mateev et al. | |
| 2003/0159070 A1 | 8/2003 | Mayer et al. | |
| 2003/0192033 A1* | 10/2003 | Gartside et al. | 717/126 |
| 2003/0217287 A1 | 11/2003 | Kruglenko | |
| 2004/0030914 A1 | 2/2004 | Kelley et al. | |
| 2004/0034794 A1 | 2/2004 | Mayer et al. | |
| 2004/0064736 A1 | 4/2004 | Obrecht et al. | |
| 2004/0080529 A1 | 4/2004 | Wojcik | |
| 2004/0143763 A1 | 7/2004 | Radatti | |
| 2004/0187023 A1 | 9/2004 | Alagna et al. | |
| 2004/0199763 A1* | 10/2004 | Freund | 713/154 |
| 2004/0225877 A1 | 11/2004 | Huang | |
| 2004/0255165 A1 | 12/2004 | Szor | |
| 2005/0021994 A1* | 1/2005 | Barton et al. | 713/200 |
| 2005/0027686 A1 | 2/2005 | Shipp | |
| 2005/0038697 A1 | 2/2005 | Aaron | |
| 2005/0091558 A1 | 4/2005 | Chess | |
| 2005/0138433 A1 | 6/2005 | Linetsky | |
| 2005/0154885 A1 | 7/2005 | Viscomi et al. | |
| 2005/0177868 A1 | 8/2005 | Kwan | |
| 2006/0074896 A1 | 4/2006 | Thomas | |
| 2006/0075494 A1 | 4/2006 | Bertman | |
| 2006/0075500 A1 | 4/2006 | Bertman | |
| 2006/0075501 A1 | 4/2006 | Thomas | |
| 2006/0080637 A1 | 4/2006 | Treit | |
| 2006/0085528 A1* | 4/2006 | Thomas | 709/223 |
| 2006/0095895 A1* | 5/2006 | K. | 717/130 |
| 2006/0101282 A1* | 5/2006 | Costea et al. | 713/188 |
| 2006/0161988 A1 | 7/2006 | Costea | |
| 2006/0230290 A1* | 10/2006 | Burtscher | 713/188 |
| 2006/0230451 A1* | 10/2006 | Kramer et al. | 726/22 |
| 2006/0236397 A1* | 10/2006 | Horne | 726/24 |
| 2006/0272021 A1* | 11/2006 | Marinescu et al. | 726/24 |
| 2007/0006311 A1* | 1/2007 | Barton et al. | 726/24 |
| 2007/0055711 A1* | 3/2007 | Polyakov et al. | 707/203 |
| 2007/0074188 A1* | 3/2007 | Huang et al. | 717/141 |
| 2007/0101435 A1* | 5/2007 | Konanka et al. | 726/27 |
| 2007/0168992 A1* | 7/2007 | Bates | 717/128 |
| 2007/0180509 A1* | 8/2007 | Swartz et al. | 726/9 |
| 2007/0250928 A1* | 10/2007 | Boney | 726/24 |
| 2007/0300303 A1* | 12/2007 | Greene et al. | 726/24 |
| 2008/0034430 A1 | 2/2008 | Burtscher | |
| 2009/0198994 A1* | 8/2009 | Tan | 713/150 |

FOREIGN PATENT DOCUMENTS

| | | |
|---|---|---|
| WO | PCT/US2006/008883 | 10/2007 |
| WO | PCT/US2006/041798 | 12/2007 |

OTHER PUBLICATIONS

Title: Evaluation of Run-Time Detection of Self-Replication in Binary Executable Malware, author: Volynkin et al, source: IEEE, dated: Jun. 21, 2006.*

U.S. Appl. No. 11/462,943, filed Aug. 7, 2006, Michael Burtscher.

Codeguru, Three Ways to Inject Your Code Into Another Process, by Robert Kuster, Aug. 4, 2003, 22 pgs.

Codeguru, Managing Low-Level Keyboard Hooks With the Windows API for VB .Net, by Paul Kimmel, Apr. 18, 2004, 10 pgs.

Codeguru, Hooking the Keyboard, by Anoop Thomas, Dec. 13, 2001, 6 pgs.

Illusive Security, Wolves in Sheep's Clothing: malicious DLLs Injected Into trusted Host Applications, Author Unknown, http://home.arcor.de/scheinsicherheit/dll.htm 13 pgs.

DevX.com, Intercepting Systems API Calls, by Seung-Woo Kim, May 13, 2004, 6 pgs.

Microsoft.com, How to Subclass a Window in Windows 95, Article ID 125680, Jul. 11, 2005, 2 pgs.

MSDN, Win32 Hooks by Kyle Marsh, Jul. 29, 1993, 15 pgs.

PCT Search Report, PCT/US05/34874, Jul. 5, 2006, 7 Pages.

Yurcik, William et al., A Planning Framework for Implementing Virtual Private Networks, Jun. 2001, IT Pro, IEEE, pp. 41-44.

Petroni, Nick L., Copilot—a-Coprocessor-based Kernel Runtime Integrity Monitor, University of Maryland, 24 pgs., College Park, MD USA.

* cited by examiner

SYSTEM AND METHOD FOR DEFINING AND DETECTING PESTWARE

RELATED APPLICATIONS

The present application is related to commonly owned and assigned application Ser. No. 11/462,943, entitled SYSTEM AND METHOD FOR DEFINING AND DETECTING PESTWARE WITH FUNCTION PARAMETERS, which is incorporated herein by reference.

COPYRIGHT

A portion of the disclosure of this patent document contains material that is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates to computer management. In particular, but not by way of limitation, the present invention relates to systems and methods for detecting and removing pestware.

BACKGROUND OF THE INVENTION

Personal computers and business computers are continually attacked by trojans, spyware, and adware, collectively referred to as "malware" or "pestware." These types of programs generally act to gather information about a person or organization-often without the person or organization's knowledge. Some pestware is highly malicious. Other pestware is non-malicious but may cause issues with privacy or system performance. And yet other pestware is actually beneficial or wanted by the user. Wanted pestware is sometimes not characterized as "pestware" or "spyware." But, unless specified otherwise, "pestware" as used herein refers to any program that collects and/or reports information about a person or an organization and any "watcher processes" related to the pestware.

Software is available to detect and remove some pestware, but many types of pestware are difficult to detect with typical techniques. For example, pestware may be obfuscated with encryption techniques so that a pestware file stored on a system hard drive may not be readily recognizable as a file that has spawned a pestware process. In yet other instances, pestware is known to be polymorphic in nature so as to change its code, data, size and/or its starting address in memory. In yet other instances, variants of known pestware are developed that alter relatively little of the functional aspects of the pestware, yet render the pestware undetectable.

Although present pestware-detection systems detect some or even most pestware, they are not sufficiently accurate or otherwise satisfactory. Accordingly, a system and method are needed to address the shortfalls of present technology and to provide other new and innovative features.

SUMMARY OF THE INVENTION

Exemplary embodiments of the present invention that are shown in the drawings are summarized below. These and other embodiments are more fully described in the Detailed Description section. It is to be understood, however, that there is no intention to limit the invention to the forms described in this Summary of the Invention or in the Detailed Description.

One skilled in the art can recognize that there are numerous modifications, equivalents and alternative constructions that fall within the spirit and scope of the invention as expressed in the claims.

The present invention can provide a system and method for defining and detecting pestware. One embodiment includes receiving a file and placing at least a portion of the file into a processor-readable memory of a computer. A plurality of execution paths within code of the pestware file are followed and particular instructions within the execution paths are identified. A representation of the relative locations of each of the particular instructions within the code of the file are compared against a pestware-definition file so as to determine whether the file is a potential pestware file.

As previously stated, the above-described embodiments and implementations are for illustration purposes only. Numerous other embodiments, implementations, and details of the invention are easily recognized by those of skill in the art from the following descriptions and claims.

BRIEF DESCRIPTION OF THE DRAWINGS

Various objects and advantages and a more complete understanding of the present invention are apparent and more readily appreciated by reference to the following Detailed Description and to the appended claims when taken in conjunction with the accompanying Drawings wherein:

DETAILED DESCRIPTION

Figure 1:
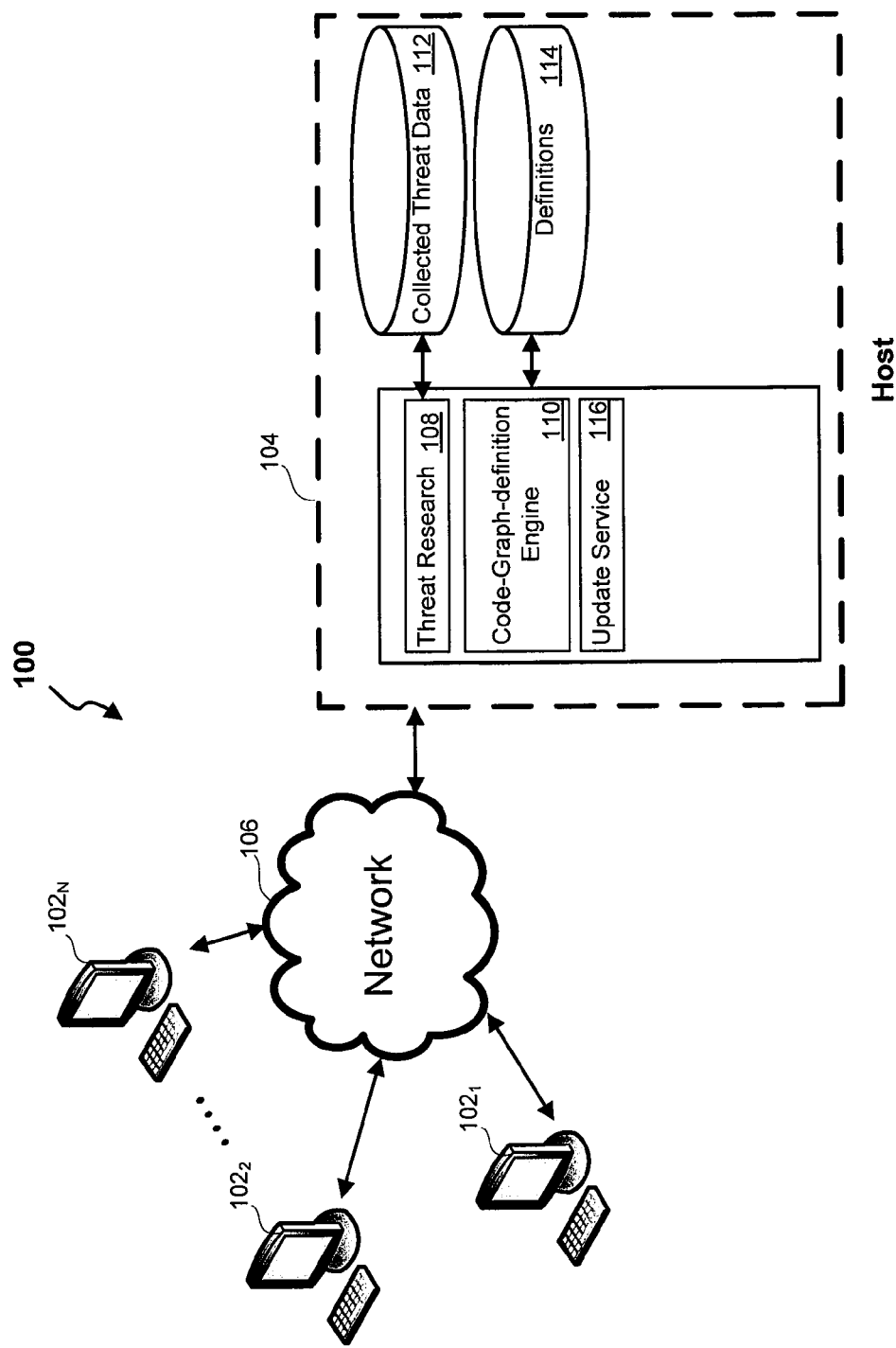
FIG. 1 is a block diagram depicting an environment in which several embodiments of the invention may be implemented.

Referring now to the drawings, where like or similar elements are designated with identical reference numerals throughout the several views. Referring first to FIG. 1, shown is a block diagram depicting an environment 100 in which several embodiments of the present invention are implemented.

As shown, N protected computers $102_{1-N}$ are coupled to a host 104 via a network 106 (e.g., the Internet). The host 104 in this embodiment includes a threat research portion 108 and a code-graph definition engine 110. Also depicted are data storage devices 112, 114 that include collected threat data 112 and code-graph-based definitions 114. The term "protected computer" is used herein to refer to any type of computer system, including personal computers, handheld computers, servers, firewalls, etc.

In accordance with several embodiments, the threat research portion 108 identifies and stores pestware threats in the threat database 112. The threat research portion 108 may, for example, actively search for pestware using bots that scour the Web for potential pestware. In addition, one or more of the N protected computers $102_{1-N}$ may provide data, via the network 106, about potential pestware to the threat research portion 108.

The code-graph definition engine 110 in this embodiment is configured to retrieve the collected pestware threats from the threat database 112 and generate code-graph-based definitions that are stored in the definition database 114. An update service 116 then makes the code-graph-based definitions available to the computers $102_{1-N}$. The illustrated arrangement of these components is logical and not meant to be an actual hardware diagram or a detailed architecture of an actual software implementation. Thus, the components can be combined or further separated in an actual implementation. Moreover, in light of this specification, the construction of each individual component is well-known to those of skill in the art.

As discussed further herein, using code-graph-based pestware definitions provides several advantages over known pestware detection methodologies. In general, the code-graph-based definitions include a collection of data that is dependent upon the overall functionality of the pestware files so that minor variations to a pestware file do not render the pestware undetectable. In many embodiments for example, the code-graph-based definitions include data that is dependent upon occurrences of one or more types of calls as well as data that is dependent upon where, in the structure of the code, the occurrences take place.

In some embodiments for example, the code-graph-based definitions may include both data that captures the occurrences of one or more types of system calls and data that captures the connectedness of the system calls in the pestware file. In other embodiments, the code-graph-based definitions may include data that is dependent upon one or more parameters of function calls (e.g., system calls) and data that is dependent upon an order of the function calls. In yet other embodiments, the code-graph-data may include data that is dependent upon particular sequences of code and the connectedness of the particular pieces of code.

Notably, if the code-graph-based definitions are based upon function calls, the identity of each function call (e.g., system call) need not be captured in the call-graph-based definitions in order for the call-graph-based definitions to provide a useful definition of the pestware. This is in contrast to known pestware detection techniques, which parse through files to locate commands which are compared with a listing of operations that are known to be potentially dangerous operations. In other words, instead of analyzing a file to determine if it includes commands that carry out operations known to be dangerous, in many embodiments of the present invention, files are analyzed based upon the occurrence of function calls irrespective of the functions associated with the functions calls.

Figure 2:
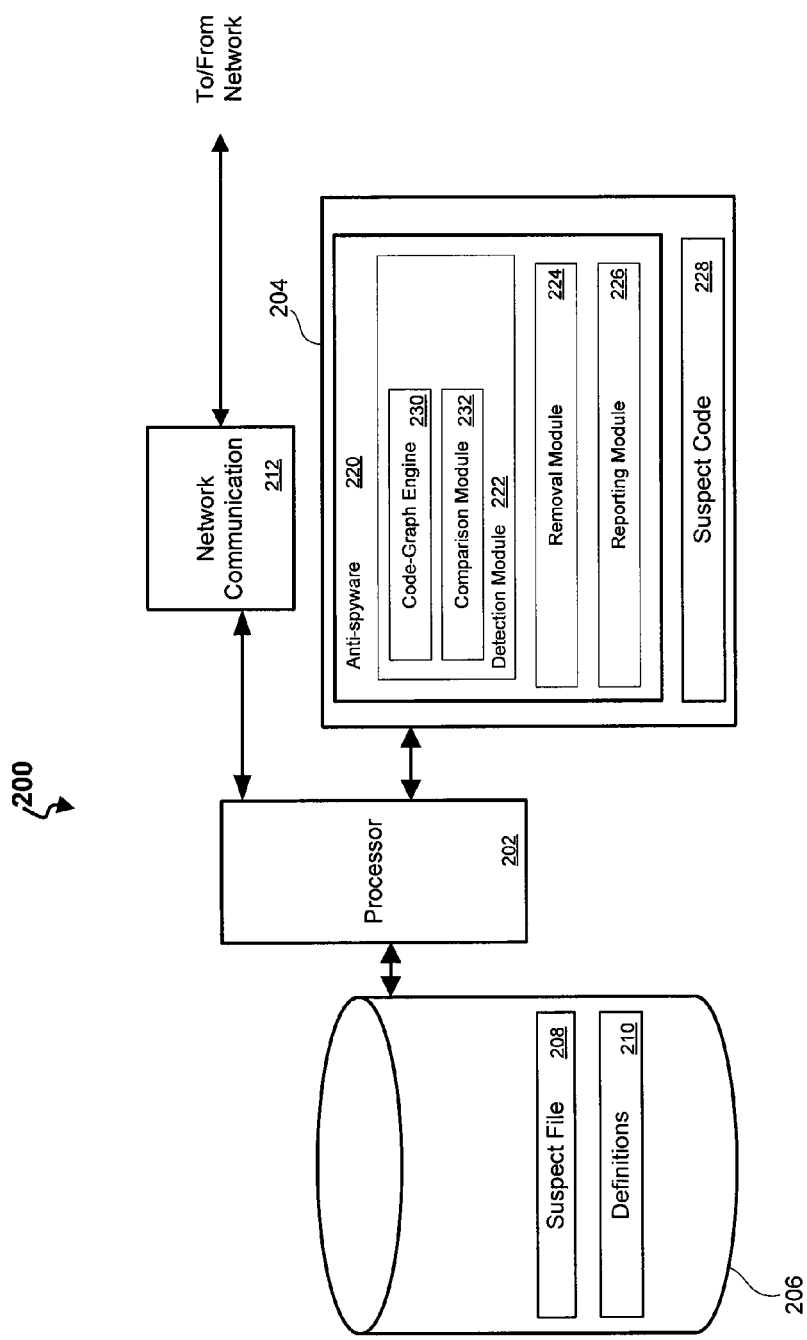
FIG. 2 is a block diagram depicting one embodiment of a protected computer.

Referring next to FIG. 2, shown is a block diagram 200 of one embodiment of a protected computer $102_{1-N}$ depicted in FIG. 1. This implementation includes a processor 202 coupled to memory 204 (e.g., random access memory (RAM)), a file storage device 206, and network communication module 212.

As shown, the file storage device 206 provides storage for a collection files which includes a suspect file 208 (e.g., received via the network 106 from a URL) and code-graph-based definitions 210 received from the update service 116 of the host 104. The file storage device 206 is described herein in several implementations as hard disk drive for convenience, but this is certainly not required, and one of ordinary skill in the art will recognize that other storage media may be utilized without departing from the scope of the present invention. In addition, one of ordinary skill in the art will recognize that the storage device 206, which is depicted for convenience as a single storage device, may be realized by multiple (e.g., distributed) storage devices.

As shown, an anti-spyware application 220 includes a detection module 222, a removal module 224, and a reporting module 226 which are implemented in software and are executed from the memory 204 by the processor 202. In addition, suspect-process code 228, which corresponds to the suspect file 208, is also depicted in memory 204.

The anti-spyware application 214 can be configured to operate on personal computers (e.g., handheld, notebook or desktop), servers or any device capable of processing instructions embodied in executable code. Moreover, one of ordinary skill in the art will recognize that alternative embodiments, which implement one or more components in hardware, are well within the scope of the present invention. It should be recognized that the illustrated arrangement of these components is logical and not meant to be an actual hardware diagram or a detailed architecture of an actual software implementation. Thus, the components can be combined or further separated in an actual implementation. Moreover, in light of this specification, the construction of each individual component is well-known to those of skill in the art.

Also shown within the detection module 222 are a code-graph engine 230 and a comparison module 232. In the exemplary embodiment, the code-graph engine 230 is configured to generate a code graph of the suspect code 228 and the comparison module 232 is configured to compare the code graph with the code-graph-based definitions 210 to assess whether the suspect code 228 is likely pestware code. Depending upon the results of the comparison carried out by the comparison module, the suspect file 208 and code 228 are removed and/or a user of the computer 200 is notified about the likelihood the suspect file 208 is a pestware file.

The configuration of the code-graph engine 230 may vary depending upon the type of code graph that the code-graph based definitions are based upon. For example, if the code-graph definition engine 110 generates code-graph-based definitions that include a representation of system calls and the relative locations of the system calls for each pestware file, then the code-graph engine 230 may be configured to generate the same type of representation of system calls along with information that captures the relative locations of the system calls so that the code-graph generated by the code-graph engine 230 is comparable with the code-graph-based definitions 210.

Figure 3:
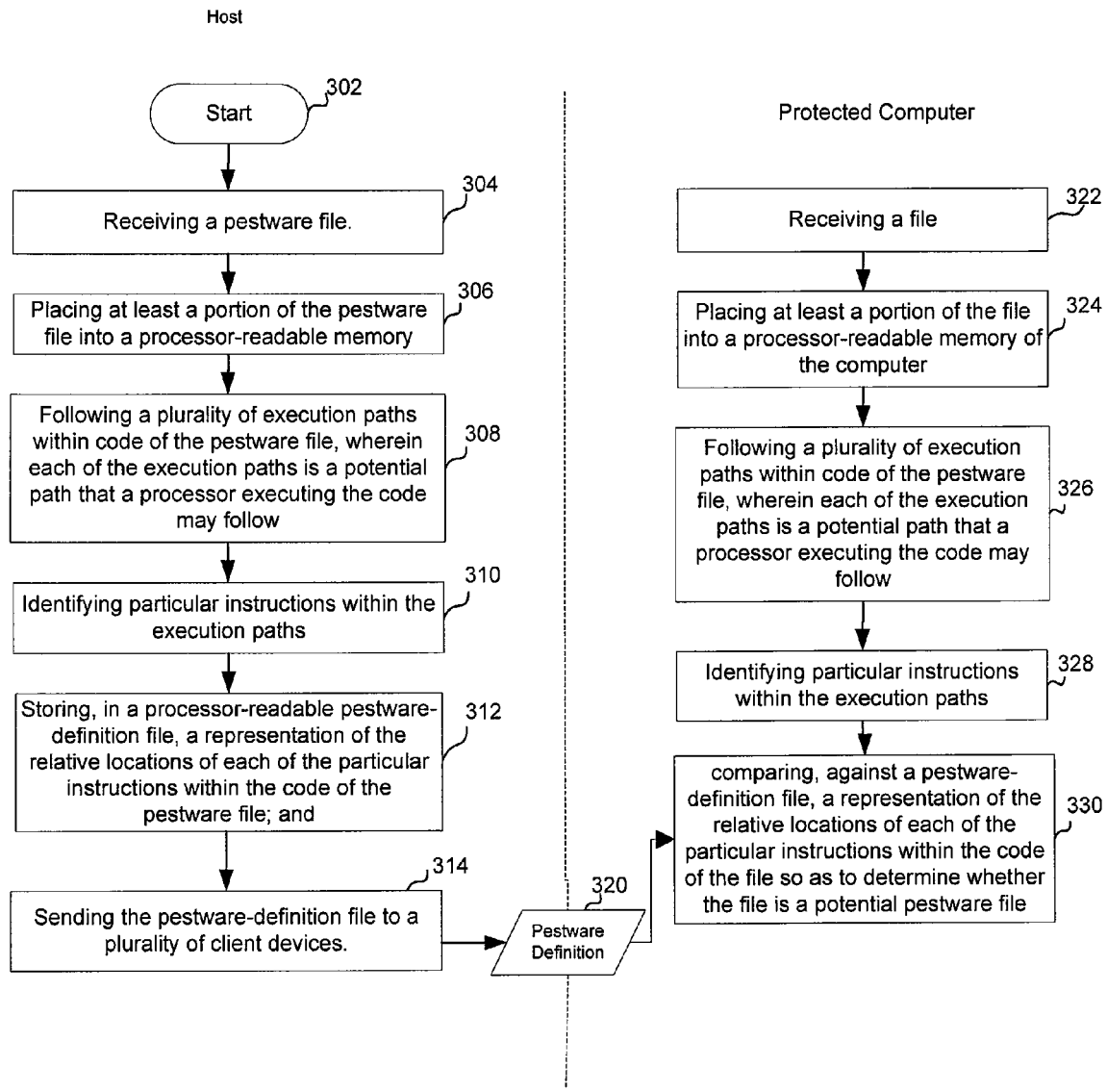
FIG. 3 is a flowchart depicting steps traversed in accordance with an exemplary embodiment of the present invention.

Referring next to FIG. 3, shown is a flow chart depicting a process for generating code-graph-based definitions and a process for using the code-graph-based definitions to analyze suspect code. While referring to FIG. 3, simultaneous reference will be made to FIGS. 1 and 2, but it should be recognized that the processes depicted in FIG. 3 are certainly not limited to being implemented in the exemplary embodiments depicted in FIGS. 1 and 2.

As shown in FIG. 3, initially a pestware file is received at a host site (Blocks 302, 304), and at least a portion of code from the file is placed in a processor-readable memory (Block 306). Referring to FIG. 1, for example, the pestware file may be identified as pestware by the threat research module 108 and stored in the threat database 112 so that it may be retrieved by the code-graph-definition engine 110.

Once code of the pestware file has been retrieved, a plurality of potential-execution paths within the code are followed (Block 308), and particular instructions within the execution paths are identified (Block 310). For example, starting with an entry point of the code from the pestware file, the code may be followed until there is a conditional jump in the code, which separates the path into two paths. Each of the separate paths is then followed, and if each of the separate paths splits into additional paths, then each of the additional paths is also followed.

While following each of the potential execution paths, particular instructions are identified (Block 310). In some embodiments, the identified instructions are function calls that are made in the code. For example, system calls may be identified within the execution paths of the code. In other embodiments, the identified instructions may be a particular sequence of instructions that are identified in the code. In other embodiments, the identified instructions can be function calls to addresses to portions of the processor-readable memory that are outside of the memory occupied by the code of the pestware file. It is contemplated, however, that one or more other types of code or code sequences may be identified and used to characterize the pestware file.

In embodiments where system calls are identified, instructions that are not jumps or conditional jumps may be ignored, and calls to addresses made within the code of the pestware may be assumed to be non-system calls and also ignored.

As shown in FIG. 3, in many embodiments a representation of the information about the relative location of each identified instructions with the code is stored in a processor-readable pestware-definition file (Block 312). In some embodiments, for each occurrence of the particular instruction(s) identified (Block 310), an indication of the occurrence is stored in connection with information about the location of the occurrence relative to other occurrences of the particular instructions.

In one embodiment, if function calls (e.g., system calls) are identified, a representation of the address of the function call is stored in connection with information that connects each function call with other function calls. As an example, the representation of the address may be the address itself, a check sum, or a hash of the address, and the information connecting the function calls may be information that relates the function calls to one another by the paths in the code where the function calls occur. It should be recognized that using an address of each system call is merely one way of attaching an identifier to each call. Moreover, the actual system functionality associated with each function calls need not be known.

Although the function associated with each function in many embodiments is not determined, it beneficial in these embodiments to attach an identifier to the function calls so that if a call is repeated, there is a way of recognizing and tracking the number of times a particular function call is made. It is contemplated, for example, that the repetition of particular function calls as well as the order in which function calls (e.g., system calls) are made in pestware code may be used to construct a definition for the pestware.

In some embodiments, the relative locations of the occurrences of particular instructions (e.g., function calls) are assembled as a tree-shaped graph in the pestware-definition file that is characterized by branches that include the particular instructions (e.g., function calls), and nodes that correspond to conditional jumps within the code. To simplify the tree, and hence the quantity of data associated with the tree, branches that do not include the particular instructions (e.g., system calls) may be ignored.

It has been found that, even when the branches that do not contain the particular instructions are ignored, comparing a graph-based pestware definition with a graph generated from a suspect file (e.g., the suspect file) may be a processor-intensive process. As a consequence, in many variations the graph is simplified by removing cycles in the tree-shaped graph to create a simplified tree. Although data is missing, it has been found that graph-based pestware definitions may be simplified in this manner and yet be effective to identify pestware.

The extent to which the graph is simplified may vary depending upon factors including the accuracy desired, the processing capabilities of the computer and/or the desired rate at which files are scanned. Although certainly not required, it has been found that a graph may be simplified so that it is linear representation of the order in which occurrences of the particular instructions occur. For example, the graph may be a linear call graph that includes data that defines an order in which system calls are made.

In some instances, pestware is designed to include conditional jumps and/or function calls that include dynamic addresses. For example, pestware may be designed so that an address is loaded into a register and a jump instruction then jumps to the value in the register. As a consequence, in some embodiments when the graph is assembled, instructions that precede the jump or call are emulated to determine the value of the register. In this way, more call and jump destinations may be determined and a more complete graph may be assembled.

As depicted in FIG. 3, once a pestware definition file generated, it is sent to one or more client computers (e.g., the N protected computers $102_{1-N}$). In many embodiments the host 104 performs research to identify new pestware threats and generates pestware definitions in accordance with Blocks 302-312 on an ongoing basis, and the N protected computers $102_{1-N}$ periodically receive the updated definitions.

From the perspective of a protected computer, when a file is received at the protected computer (e.g., via the network communication module 212 or portable media), at least a portion of the file is placed in processor-readable memory (e.g., memory 204) of the computer (Blocks 322, 324). Once in memory, a plurality of execution paths within the code are followed, and particular instructions within the execution paths are identified (Blocks 326, 328). As will be appreciated by one of ordinary skill in the art, the manner in which the steps depicted by Blocks 326 and 328 is carried out may vary, but these steps are dependent upon how the pestware definition file is generated at Blocks 308-310. For example, if system calls are identified in Block 310, then system calls are also identified in Block 328.

As shown in FIG. 3, a representation of the relative locations of each of the particular instructions identified in Block 328 is compared against the pestware definition file generated at Block 312 to determine whether the file is a potential pestware file (Block 330).

In embodiments where the particular instructions are function calls (e.g., system calls), the relative locations of function calls found within the code of the analyzed file is compared against the relative locations of the function calls in the pestware-definition file. In some of these embodiments a comparison of locations of identifiers of the function calls of the analyzed file and the pestware-definition file is made. As discussed, the manner in which each function call is represented may be arbitrary in that each function call may be given an identifier that may or may not connote the actual function associated with the function call.

When comparing locations of each of the particular instructions (Block 330), in many embodiments the longest matching sequence of particular instructions between the pestware-definition file and the analyzed file is found. If the particular instructions are systems calls for example, the longest matching sequence of system calls between the pestware file and the analyzed file is found.

Beneficially, comparing where particular instructions occur makes it more difficult for producers of pestware to effectively disguise pestware with minor alterations. Specifically, due to time and cost considerations, pestware producers are more likely to make alterations that affect how pestware code appears, but not how the pestware code operates. And the order in which particular instructions occur (e.g., function calls) is determined by how the code operates. As a consequence, unless a pestware file is substantially altered so that the functionality of the pestware is altered, the pestware detection techniques described herein remain effective.

It should be recognized that the comparison between the pestware-definition file and the file being analyzed may generate substantially less than a 100 percent match, and yet, provide a strong indication that the analyzed file is a pestware file. For example, in many instances pestware producers are more inclined to add functionality to their pestware offerings. And when adding new functionality, the existing core functionality is often left in place. As a consequence, if the additional functionality corresponds to 30 percent of the function calls in an enhanced pestware file, a match between 60 percent of the function calls of the enhanced pestware file and a pestware-definition based upon the original pestware file strongly suggests that the enhanced pestware file is indeed pestware.

Similarly, if a portion of an original pestware file is removed or replaced, there may be substantially less than 100 percent match between the pestware-definition file and the enhanced pestware file. But if the remaining portion of original pestware file is a substantial portion of the enhanced file (e.g., the remaining portion includes 60 percent of the function calls of the enhanced file) there may still be enough matches (e.g., 50 percent) between the original pestware-definition and the enhanced pestware file to at least render the analyzed file a potential pestware file.

As a consequence, in some embodiments a weighting scheme is used in connection with the type of match found between the pestware-definition file and the analyzed file. For example, a greater weight may be applied to a particular percentage of matching function calls when certain function calls in the analyzed file are missing as compared to the same percentage of matching function calls when certain function calls have been replaced with other function calls.

In addition, it is contemplated that, based upon the extent the pestware-definition matches the analyzed file, the pestware file may be quarantined, removed or a user of the computer may be informed about the likelihood that the analyzed file is a pestware file.

In conclusion, the present invention provides, among other things, a system and method for defining and detecting pestware. Those skilled in the art can readily recognize that numerous variations and substitutions may be made in the invention, its use and its configuration to achieve substantially the same results as achieved by the embodiments described herein. Accordingly, there is no intention to limit the invention to the disclosed exemplary forms. Many variations, modifications and alternative constructions fall within the scope and spirit of the disclosed invention as expressed in the claims.

What is claimed is:

1. A method for generating pestware definitions comprising:
   receiving a pestware file;
   placing at least a portion of the pestware file into a processor-readable memory;
   following a plurality of execution paths within code of the pestware file, wherein each of the execution paths is a potential path that a processor executing the code will potentially follow;
   identifying particular instructions within the execution paths;
   storing, in a processor-readable pestware-definition file, a representation of the relative locations of each of the particular instructions within the code of the pestware file; and
   sending the pestware-definition file to a plurality of client devices, wherein at least one of the client devices receives a file and determines whether relative locations of each of particular instructions within code of the file received by the at least one client device match at least a predetermined percentage of relative locations of instructions in the pestware-definition file.

2. The method of claim 1, wherein the identifying includes identifying system calls within the execution paths.

3. The method of claim 1 including:
   simplifying the representation of the relative locations so as to create a simplified representation of the relative locations, wherein the storing includes storing the representation as the simplified representation.

4. The method of claim 1 including:
   bypassing, while following the plurality of execution paths, instructions other than system calls and jump instructions.

5. The method of claim 1, wherein identifying particular instructions includes identifying calls to addresses to portions of the processor-readable memory that are outside of the memory occupied by the code of the pestware file.

6. The method of claim 5, including:
   storing a representation of each of the addresses in connection with a corresponding one of the locations so as to identify each call by an address.

7. The method of claim 6, including:
   storing a representation of each of the names of the calls in connection with a corresponding one of the locations so as to identify each call by a name.

8. A method for detecting pestware on a computer comprising:
   receiving a file;
   placing at least a portion of the file into a processor-readable memory of the computer;
   following a plurality of execution paths within code of the file, wherein each of the execution paths is a potential path that a processor executing the code will potentially follow;
   identifying particular instructions within the execution paths;
   comparing, against a pestware-definition file, a representation of the relative locations of each of the particular instructions within the code of the file so as to determine whether the file is a potential pestware file; and
   determining whether the relative locations of each of the particular instructions within the code match at least a predetermined percentage of relative locations of instructions in the pestware-definition file.

9. The method of claim 8, wherein the identifying includes identifying system calls within the execution paths.

10. The method of claim 8 including:
    simplifying the representation of the relative locations so as to create a simplified representation of relative locations, wherein the comparing includes comparing the representation as the simplified representation.

11. The method of claim 8 including:
    bypassing, while following the plurality of execution paths, instructions other than system calls and jump instructions.

12. The method of claim 8, wherein identifying particular instructions includes identifying calls to addresses to portions of the processor-readable memory that are outside of the memory occupied by the code of the pestware file.

13. The method of claim 8 including:
alerting a user of the computer in the event the relative locations of each of the particular instructions within the code match at least a predetermined percentage of relative locations of instructions in the pestware-definition file.

14. The method of claim 8 including:
quarantining the file in the event the relative locations of each of the particular instructions within the code match at least a predetermined percentage of relative locations of instructions in the pestware definition file.

* * * * *